Aug. 14, 1956   J. DE GIER ET AL   2,758,942
CATHODE-RAY TUBE OF THE KIND COMPRISING A LUMINESCENT SCREEN
Filed April 2, 1953
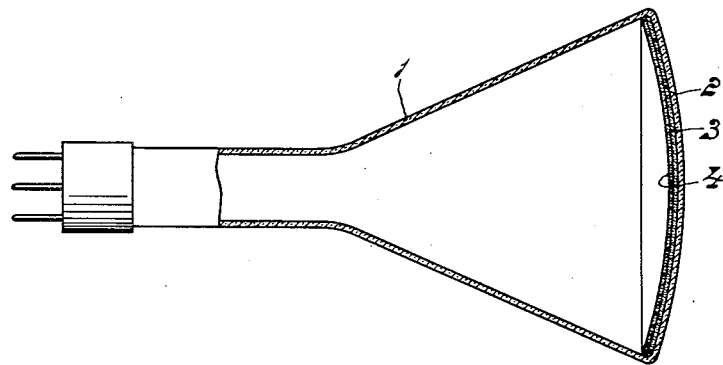
INVENTORS
JOHANNES DE GIER
JAN PEPER
BY
AGENT

United States Patent Office 2,758,942
Patented Aug. 14, 1956

2,758,942

CATHODE-RAY TUBE OF THE KIND COMPRISING A LUMINESCENT SCREEN

Johannes de Gier and Jan Peper, Eindhoven, Netherlands, assignors to Hartford National Bank and Trust Company, Hartford, Conn., as trustee Application April 2, 1953, Serial No. 346,370

Claims priority, application Netherlands April 4, 1952

5 Claims. (Cl. 117—33.5)

The invention relates to a cathode-ray tube comprising a luminescent screen and to a method of manufacturing such a tube, more particularly, a luminescent screen for use in such a tube. With a cathode-ray tube comprising a luminescent screen, on which an image is produced, one of the most important problems is the charge of this screen produced by the large quantity of electrons supplied by the cathode-ray, since many screens have such poor conductivity that this charge can by no means be conducted away electrically. In order to improve the conductivity the luminescent material has been mixed with a conductive substance, for example, metal. As an alternative, the luminescent substance has been applied to a metal layer. In all other cases one must have recourse to the secondary-emission properties of the luminescent material for conducting away the charge, since, if the secondary-emission coefficient of the luminescent material is equal to 1 or higher than 1, the screen will obviously not be charged. This does not apply to many luminescent substances, so that in these cases the inconvenient phenomena due to charge of the screen become manifest. These phenomena are inter alia: unsharpness of the spot on the screen, irregular, weak illumination of screen portions not struck by electrons and so on.

It has been suggested to improve the secondary-emission of a luminescent screen by applying caesium by volatilization and by converting the caesium by oxidation into caesium oxide. In this known method a quantity of caesium provided at a suitable area in the cathode-ray tube is evaporated, after the cathode-ray tube has been sealed and evacuated, and the vapour is caused to precipitate on the screen. By heating a quantity of substance, for example, manganese dioxide, provided at another area in the tube, oxygen is produced, converting the caesium on the screen into caesium oxide.

It has been found that the use of a caesium oxide layer has a few limitations since the connection between caesium and oxygen is not sufficient for the caesium oxide to prevent it from dissociating during the electron bombardment. Thus the secondary-emission coefficient of a luminescent screen coated with caesium oxide will drop during the use of the tube. There are even indications that the secondary-emission coefficient may drop below that of the luminescent material not treated. The caesium oxide has a further limitation in that the atomic weight of the caesium is high. Hence the caesium oxide retains a comparatively great number of electrons, which would otherwise contribute to the luminous output of the screen.

A cathode-ray tube according to the invention has a luminescent screen coated with a layer of magnesia on the side facing the cathode.

The thickness of this layer is preferably between 10 and 1000 A.

The use of magnesia ensures a very high secondary-emission coefficient, which drops slowly during the use of the tube, it is true, but which remains always higher than 1, since the connection between magnesium and oxygen is very strong.

Against the caesium oxide the magnesia has, moreover, the great advantage that the atomic weight of magnesium is considerably lower than that of caesium.

A luminescent layer in a cathode-ray tube according to the invention may be coated with magnesia in various ways. After the luminescent layer has been applied to a carrier, mostly the glass wall of the cathode-ray tube, a quantity of magnesium may be evaporated in vacuo, the vapour being caused to contact with the luminescent screen, to which it adheres at least in part. The vaporisation of the magnesium must be carried out before the electrode system has been introduced into the cathode-ray tube, since otherwise this system, which comprises inter alia a cathode, is coated with magnesium, which would be a great disadvantage, since it would detract from the emission of the cathode and conductive deposits might be formed between the various electrodes. After the magnesium has been precipitated on the luminescent layer, the magnesium is converted into magnesia by heating the luminescent layer in an atmosphere containing oxygen, for example, in air. Not until then the electrode system is secured in the tube, which may subsequently be finished in the normal way.

In many cathode-ray tubes the sidewall of the tube is coated with a layer of poor light reflectivity, for example, consisting of carbon. This coating is mostly performed by painting the wall with a suspension of carbon in a combustible binder, for example, the commercial "Aquadag." The binder may be removed by burning and this phase of the manufacturing process of such a cathode-ray tube may be combined with the oxidizing of the magnesium on the luminescent layer.

The magnesium may, of course, as an alternative, be evaporated under lower pressure in an atmosphere containing a sufficient quantity of oxygen, for example, in air, in order to oxidize the magnesium during the vaporisation. Then the luminescent layer is directly coated with magnesia.

A quite different method of coating the luminescent screen with magnesia, this method forming also part of the invention, consists in that the luminescent layer, which has been previously applied to a carrier, is caused to contact with a cloud of magnesia, from which, owing to the effect of the force of gravitation, a quantity of magnesia settles down on the luminescent material. The cloud of magnesia may be readily obtained by burning a quantity of magnesium. This burning of magnesium need not take place in the vessel containing the luminescent layer. In accordance with a particular form of a method according to the invention a quantity of magnesium is burnt in a stock vessel, where magnesia is produced, which may be supplied, for example, by pumping or pouring, to a vessel containing the luminescent layer. The time required for obtaining a sufficient deposit of magnesia is 10 to 15 minutes. The precipitation produced only by the force of gravitation yields a very uniform coating of the screen.

The precipitation of the magnesia on the screen may be accelerated by providing an electrostatic charge between the cloud of magnesia and the screen.

In general the application of magnesium or magnesia will be performed in the cathode-ray tube itself, in which the luminescent screen is used. This, however, is not necessary, since a loose luminescent screen, for example, for use in electron microscopes, may be manufactured, as an alternative, in a suitable closed space outside the discharge tube proper.

The invention will now be explained more fully with reference to the accompanying drawing.

In the drawing 1 is the wall of a cathode-ray tube having a transparent window 2, coated on the inside of the tube with the luminescent layer 3. On the side facing the cathode this layer 3 is coated with the layer 4 consisting of magnesia.

What we claim is:

1. A method of manufacturing a luminescent screen for a cathode-ray tube comprising forming a layer of luminescent material on a supporting surface, and depositing on said luminescent layer a layer of magnesium oxide having a thickness of about 10 to 1000 A.

2. A method, as claimed in claim 1, in which the luminescent layer is applied to a portion of the inner wall of an envelope of a cathode-ray tube and before insertion of an electrode system, a supply of magnesium is converted to magnesium oxide vapor, the magnesium oxide vapor being deposited on the luminescent layer.

3. A method, as claimed in claim 2, in which the magnesium oxide layer is precipitated on the luminescent layer.

4. A method, as claimed in claim 3, in which the magnesium is burnt in a separate vessel and the magnesium oxide vapor is transferred to the cathode-ray tube envelope.

5. A method, as claimed in claim 4, in which the magnesium oxide layer is electrostatically precipitated on the luminescent layer.

References Cited in the file of this patent

UNITED STATES PATENTS

| | | |
|---|---|---|
| 2,121,356 | Knoll | June 21, 1938 |
| 2,161,458 | DeBoer et al. | June 6, 1939 |
| 2,224,324 | Von Stennis | Dec. 10, 1940 |
| 2,242,644 | DeBoer | May 20, 1941 |
| 2,376,437 | Leverenz | May 22, 1945 |
| 2,418,780 | Leverenz | Apr. 8, 1947 |
| 2,435,435 | Fonda | Feb. 3, 1948 |
| 2,665,220 | DeGier | Jan. 5, 1954 |
| 2,685,660 | Norgaard | Aug. 3, 1954 |
| 2,689,927 | Bradley | Sept. 21, 1954 |